United States Patent [19]

Kazaoka et al.

[11] 4,285,487
[45] Aug. 25, 1981

[54] ASSEMBLY FOR LOCKING AND UNLOCKING AN AUTOMOBILE SEAT IN SELECTED VERTICAL POSITIONS

[75] Inventors: Kenichi Kazaoka, Nagoya; Masayuki Hayashi, Toyohashi, both of Japan

[73] Assignee: Aisin Seiki Kabushiki Kaisha, Kariya, Japan

[21] Appl. No.: 30,471

[22] Filed: Apr. 16, 1979

[30] Foreign Application Priority Data

Apr. 17, 1978 [JP] Japan .................................. 53/44925

[51] Int. Cl.³ .............................................. B60N 3/06
[52] U.S. Cl. ..................................... 248/396; 248/394
[58] Field of Search ........................ 248/396, 394, 371

[56] References Cited

U.S. PATENT DOCUMENTS

| | | | |
|---|---|---|---|
| 2,179,085 | 11/1939 | De Rose | 248/394 |
| 2,609,029 | 9/1952 | Haberstump | 248/394 |
| 2,795,267 | 6/1957 | Williams | 248/394 |
| 3,525,496 | 8/1970 | Colautti et al. | 248/394 |
| 3,669,398 | 6/1972 | Robinson | 248/394 |
| 3,692,271 | 9/1972 | Homier et al. | 248/396 |

*Primary Examiner*—Francis K. Zugel
*Attorney, Agent, or Firm*—Finnegan, Henderson, Farabow, Garrett & Dunner

[57] ABSTRACT

A seat-supporting assembly for locking and unlocking an automobile seat in selected vertical positions includes a seat rail, a floor rail, a rotatable latch member, a locking plate and manual lever. The latch member is pivotably mounted at one point to the seat rail and at a second point to the floor rail for permitting the selective adjustment of the relative positions of the rails upon its rotation and includes a plurality of spaced notches. The locking plate is rockably connected to one of the rails and has a pin for engaging a selected one of the notches in the latch member to lock the latch member in a selected position. The lever is rotatably connected to a rail to rock the locking plate to an unlocking position. The assembly includes a spring for urging the locking plate and the lever into a locking position.

5 Claims, 4 Drawing Figures

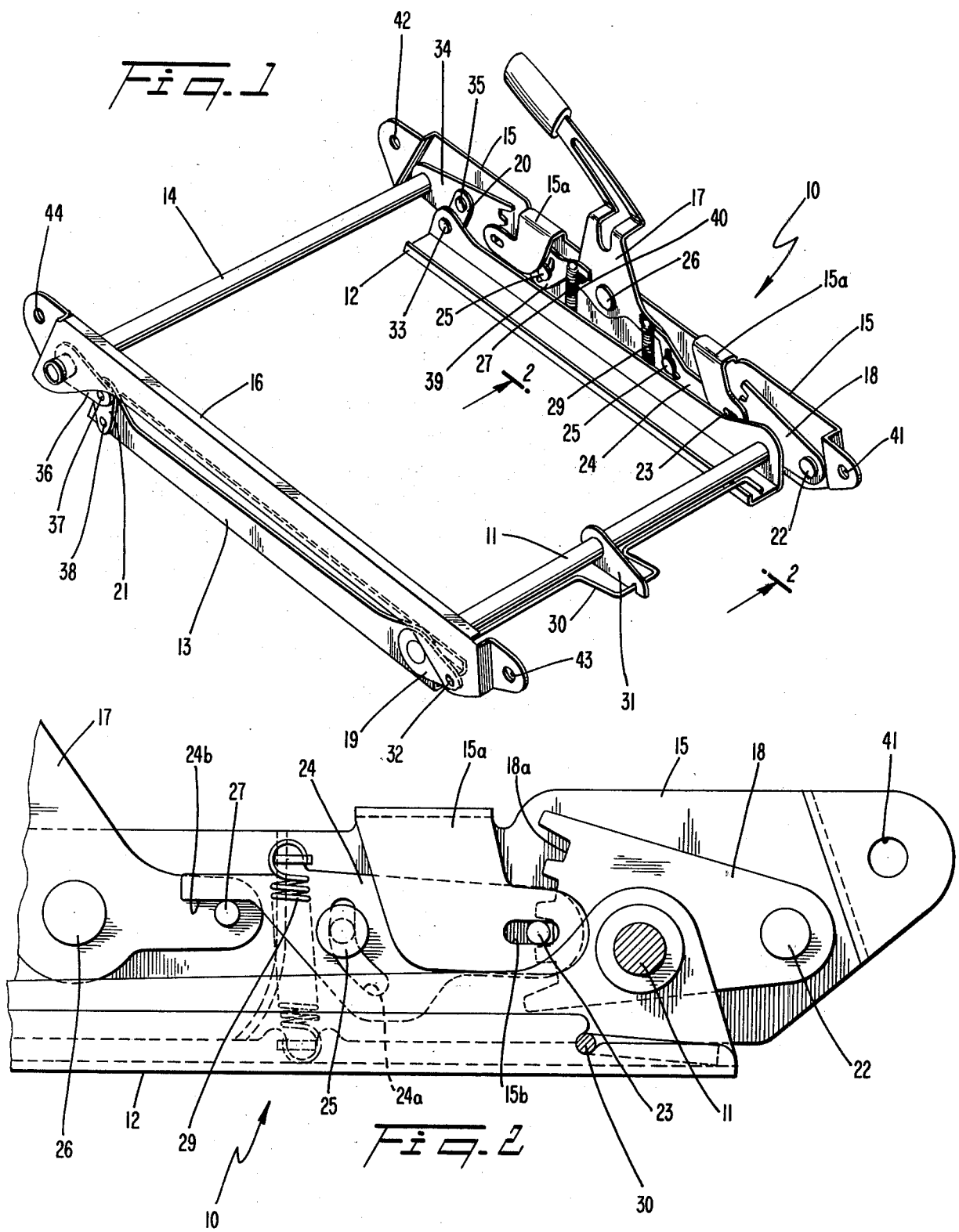

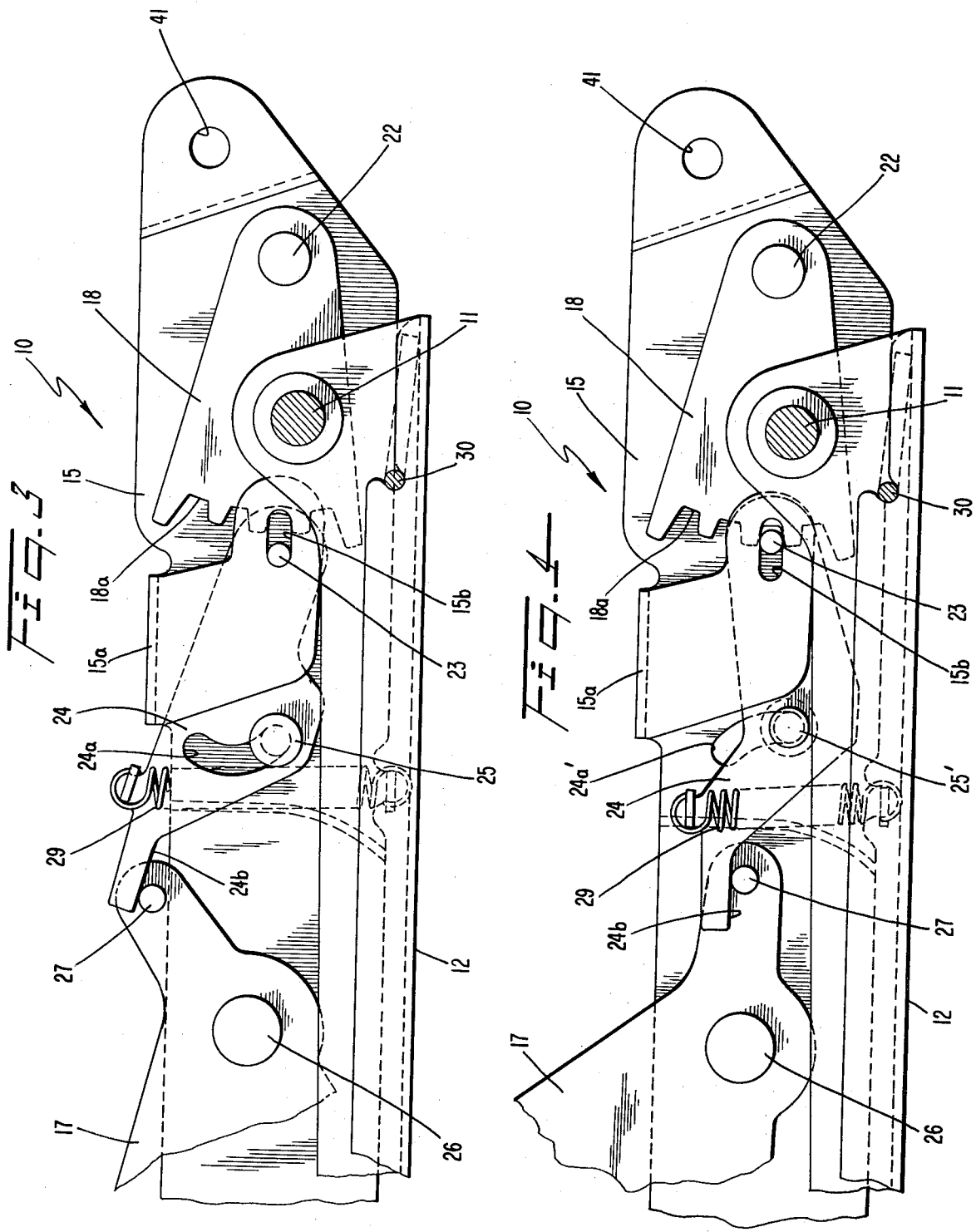

ASSEMBLY FOR LOCKING AND UNLOCKING AN AUTOMOBILE SEAT IN SELECTED VERTICAL POSITIONS

BACKGROUND OF INVENTION

1. Field of the Invention

The present invention relates to improvements in an adjustable seat-supporting assembly. More particularly, the present invention is concerned with an assembly for adjusting the vertical position of an automobile seat with respect to an automobile floor.

2. Description of the Prior Art

In automobiles, it is a common practice to vertically adjust the seat position with respect to the base floor. For this purpose there have been proposed a number of adjusting assemblies such as, for example, the assembly disclosed in German First Publication No. 2,206,884 published on Sept. 6, 1973. Although conventional assemblies, such as the one disclosed in the German Publication, have been satisfactory as far as the primary purpose of adjustment and support of the seat position are concerned, they are complicated in structure and include many separate components. Specifically, conventional assemblies include a latch member pivotably mounted on a stationary bracket, a pawl member adapted to engage and disengage the latch member, a locking member operatively connected to the pawl member to engage or release the pawl member from the latch member, and a manual lever connected to the locking member. These members are conventionally made separate from each other. As a result, conventional assemblies are complicated in structure as a whole. This complication of structure not only increases cost but also decreases the durability of conventional adjusting assemblies.

SUMMARY OF THE INVENTION

It is, therefore, an object of the present invention to provide an adjustable seat-supporting assembly which overcomes the disadvantages in conventional assemblies.

Another object of the present invention is to provide an improved adjustable seat-supporting assembly which is low in cost and simple in construction.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, embodied and broadly described herein, the invention comprises a seat-supporting assembly for locking and unlocking an automobile seat in selected vertical positions comprising a seat rail for attachment to an automobile seat, a floor rail for attachment to an automobile floor, a rotatable latch member pivotably mounted at one point to the seat rail and at a second point to the floor rail for permitting the selective adjustment of the relative positions of the rails upon its rotation, the latch member including a plurality of spaced stops, a locking plate rockably connected to one of the rails, the locking plate including means for engaging a selected one of the stops to lock the latch member in a selected position upon the rocking of the locking plate to a locking position and for disengaging the stops to unlock the latch member upon the rocking of the locking plate to an unlocking position, and a lever rotatably connected to one of the rails for rocking the locking plate to an unlocking position to permit the adjustment of the rails.

The present invention overcomes the problems and disadvantages of the prior art by providing a locking member which fulfills the functions of both the latch member and the pawl member of conventional assemblies.

It is to be understood that both the foregoing general description and the following detailed description are exemplary and explanatory only and are not restrictive of the invention, as claimed.

The accompanying drawings, which are incorporated in and constitute a part of the Specification, illustrate an embodiment of the invention and together with the description, serve to explain the principles of the invention.

BRIEF DESCRIPTION OF THE DRAWINGS

FIG. 1 is a perspective view showing one embodiment of the seat-supporting assembly according to the present invention.

FIG. 2 is an enlarged partial section view of the seat-supporting assembly taken along line 2—2 of FIG. 1 and showing the locking plate in a locking position.

FIG. 3 is a partial section view similar to FIG. 2 but showing the locking plate in a unlocking position.

FIG. 4 is a partial sectional view similar to FIG. 2 but showing a second rockable connection between the locking plate and a rail of the invention.

DESCRIPTION OF THE PREFERRED EMBODIMENT

Reference will now be made in detail to the present preferred embodiment of the invention, an example of which is illustrated in the accompanying drawings.

Referring first to FIG. 1 of the drawings, seat-supporting assembly, generally indicated by the reference numeral 10, is shown. The assembly 10 includes a pair of parallel lower, i.e., floor, rails 12 and 13 in which is rotatably mounted a shaft 11 and a pair of parallel upper, i.e., seat, rails 15 and 16 in which is rotatably mounted a shaft 14. The shafts 11 and 14 are preferably mounted substantially at opposite ends of the lower rails 12, 13 and upper rails 15, 16, respectively, to form a rectangular arrangement.

When in actual use, the lower rails 12 and 13 are secured to an automobile floor (not shown) or an adjusting mechanism (not shown) for sliding the seat in the longitudinal direction of the vehicle. As shown, the lower floor rails 12 and 13 are parallel to one another and to seat rails 15 and 16. When in use, seat rails 15 and 16 are secured to a seat of an automobile (not shown). The seat rails include installation holes 41, 42, 43, and 44 for accepting bolts or screws to fix a seat to the rails. The rails 12 and 15 and 13 and 16 are inter-connected, respectively, by linkages for vertical adjustment as explained hereinafter.

Shaft 11 is fixedly connected at its ends to a latch member 18 and a link 19. At one end, shaft 14 protrudes through an aperture in a latch member 34 to which it is fixed and is pivotably mounted in the front portion of seat rail 15. At the other end, shaft 14 protrudes through an aperture in a link 36, to which it is fixed, and is pivotably mounted in the front portion of seat rail 16.

Latch member 18 and link 19, fixedly mounted at the ends of shaft 11, are pivotably mounted, respectively, in the corresponding ends of the upper rails 15 and 16. Latch member 34 and link 36, through which the shaft 14 extends for pivotal mounting in the upper rails 15 and 16, are pivotably mounted through short links 20 and 21, respectively, to the floor rails 12 and 13.

As shown in FIG. 1, link 19 is pivotably mounted at one point to the rear portion of seat rail 16 by a pin 32 and is pivotably mounted at a second point to floor rail 13 by shaft 11. Short link 20 is pivotably mounted at one point on the front portion of floor rail 12 through a pin 33 and at a second point to latch member 34 by a pin 35. Short link 21 is pivotably mounted at one end on link 36 by a pin 37 and at the other end to the front portion of floor rail 13 by a pin 38.

The assembly 10 includes a manual lever 17 which is pivotably mounted on seat rails 15. In operation, the rotation of manual lever 17 unlocks the seat assembly 10 and permits the relative vertical movement of the seat rails and floor rails through the four linkages 18, 19, the combination of latch member 34 and short link 20, and the combination of the two links 36 and 21.

The locking and unlocking of the assembly 10 by the rotation of manual lever 17 is effected by the combined operation of lever 17, latch members 18 and 34 and a locking plate 24 and a locking plate 39. The interrelationship and operation of these members of the assembly are illustrated in FIGS. 2, 3, and 4.

As shown in FIG. 2, latch 18 is pivotably mounted at one end to seat rail 15 by a pin 22. The latch member is fixedly connected to shaft 11 and is provided with a plurality of spaced notches 18a formed at the end opposite the pin 22. The notches act as stops. The latch member 18 is pivotably mounted to the floor rail 12 through shaft 11. Upon the rotation of latch member 18, the relative positions of one end of seat rail 15 and floor rail 12 are adjusted.

In accordance with the invention, the assembly includes means for selectively engaging and disengaging the spaced stops or notches 18a to allow the rotation of latch member 18 and the relative adjustment of the upper and lower rails when these stops are disengaged and to preclude the rotation of the latch member 18 and the relative adjustment of the upper and lower rails when these stops are engaged. As embodied herein, this means comprises locking plate 24 rockably connected through an arcuate slot 24a and a pin 25 to seat rail 15, the locking plate including a pin 23 for engaging a selected one of notches 18a to lock the latch member 18 in a selected position upon the rocking of the locking plate 24 to a locking position (as shown in FIG. 2), the lever 17 rotatably connected to rail 15 for rocking the locking plate 24 to an unlocked position (as shown in FIG. 3) and a spring 29 for urging locking plate 24 and lever 17 into locking position.

As stated above, the seat-supporting assembly 10 includes locking plate 24 rockably mounted on seat rail 15. Stop pin 23 is fixedly connected at one end of the locking plate 24 and is slidably mounted in a horizontal slot 15b formed in a flange 15a of seat rail 15. Slot 15b aligns stop pin 23 with a selected one of notches 18a, depending upon the relative rotation of latch member 18. When the pin 23 engages a notch 18a, the rotation of latch member 18 and the corresponding adjustment of rails 12 and 15 is precluded. When the pin 23 is disengaged from the notches 18a, the latch member 18 can be rotated and the upper and lower rails relatively adjusted.

As stated above, the locking plate 24 is provided with eccentrically arcuate, elongated slot 24a in which is slidably mounted pin 25 which is fixed to seat rail 15. A helical retracting spring 29 is connected between the locking plate 24 and the floor rail 12 for urging downwardly an end of the locking lever 24 opposite pin 23 and beyond arcuate slot 24a.

The manual lever 17 is pivotally connected to the seat rail 15 by a pin 26 and has a substantially horizontal extension substantially aligned with the pin 23. A pin 27 is fixedly mounted on the horizontal extension and is positioned under the lower edge 24b of the locking plate 24. Spring 29 normally urges the lower face 24b of the locking plate 24 into engagement with the pin 27. The counterclockwise rotation of lever 17 applies leverage to the locking plate 24 to rock it clockwise, the slot 24a following the pin 25. Upon the clockwise rotation of locking plate 24 along pin 25, stop pin 23 is pulled outwardly from the occupied notch 18a. As shown in FIG. 3, a sufficient clockwise rotation of locking plate 24 disengages pin 23 from the occupied notch 18a and releases latch member 18.

Although the lever 17 is illustrated as being pivotally mounted on the seat rail 15, it is apparent that the lever could be mounted in the floor rail 12. Likewise, locking plate 24 could be mounted in the floor rail 12.

As shown in FIG. 1, the assembly 10 also includes apparatus for allowing relative adjustment of the front ends of the upper and lower rails. The apparatus includes latch member 34, a locking plate 39 and a second helical retracting spring 40. These members are identical in structure and function to latch member 18, locking plate 24 and spring 29, respectively, and therefore will not be described separately.

The assembly 10 further includes a torsion spring 30. As shown in FIG. 1, torsion spring 30 is fixed to the rear portions of the floor rails 12 and 13 and engages a plate 31 fixed to the central portion of the shaft 11. The torsion spring 30 urges shaft 11, latch member 18, and link 19 to rotate in a counterclockwise direction, i.e., to separate the upper and lower rails and lift the seat rails 15, 16.

FIG. 2 illustrates the assembly 10 in the locked position. Manual lever 17 is in the rest position and is resiliently held in the posittion by springs 29 and 40. Pin 25 is positioned in the upper portion of the eccentrically arcuate elongated slot 24a, and locking plate 24 is slide toward the right so that pin 23 engages a selected notch 18a in latch 18. FIG. 2 illustrates the assembly for positioning the seat (not shown) in the vertical middle position with pin 23 engaging the middle notch 18a of the latch 18.

FIG. 3 illustrates the locking 24 plate in the release or unlocked position. When the rear portion of a seat is to be raised, the manual lever 17 is rotated in the counterclockwise direction about pin 26 against the force of spring 29. The counterclockwise rotation of lever 17 rocks locking plate 24 in the clockwise direction. Upon this clockwise rotation of locking plate 24, pin 23 moves left along slot 15b and disengages notch 18a. This disengagement permits the rotation of latch member 18 and the relative adjustment of the rear ends of the upper and lower rails.

In operation, upon the disengagement of stop pin 23 from a notch 18a, spring 30 urges the counterclockwise rotation of shaft 11, latch member 18 and link 19. If these elements are permitted to rotate in the counterclockwise direction, rails 15 and 16 rotate in a counterclockwise direction around shaft 14 to lift the rear portion of the rails 15 and 16 with respect to floor rails 12 and 13. When the rear portion of the seat has been moved to its desired position, lever 17 is released to the force of spring 29, thereby permitting locking plate 24 to move to the right so that pin 23, guided by slot 15b, engages a selected notch 18a under the bias of the spring.

It will be apparent without detailed explanation that the rear portion of the seat could be moved downwardly after the counterclockwise rotation of manual lever 17. In that case, the exerting force of spring 30 would have to be overcome, for instance, by the weight of a person on the seat.

When it is desired to move the front portion of the seat up or down, the manual lever 17 is rotated in the clockwise direction around the pin 26 and against the force of spring 40. Upon that clockwise rotation, the locking plate 39 moves to the right and releases latch member 34. Upper rails 15 and 16 can then be rotated about shaft 11 to lift up or move down the front portion of the seat through the rotation of latch 34, link 20, link 36 and link 21. When the front portion of the seat is moved to the desired position, manual lever 17 is released and locking plate 39 under the tension of spring 40 engages latch member 34.

FIG. 4 shows another means of rockably connecting the locking plate 24 and the rail 15. In the embodiment, the pin 25' is fixedly secured to locking plate 24 and is slidably mounted within an accentrically arcuate elongated slot 24a' formed in rail 15. The operation and relative motion of locking plate 24 and rail 15 are identical to that shown in FIG. 2.

Other embodiments of the invention will be apparent to those skilled in the art from consideration of the specification and practice of the invention disclosed herein. It is intended that the specification and examples be considered as exemplary only with the true scope and spirit of the invention being indicated by the following claims.

What is claimed is:

1. A seat-supporting assembly for locking and unlocking an automobile seat in selected vertical positions comprising:

a seat rail for attachment to an automobile seat, a floor rail for attachment to an automobile floor, a rotatable latch member pivotably mounted at one point to the seat rail and at a second point to the floor rail for permitting the selective adjustment of the relative portions of the rails upon its rotation, said latch member including a plurality of spaced notches, a locking plate rockably connected to one of said rails by the combination of a first pin fixedly mounted on said one of said rails and an elongated arcuate slot formed in said locking plate, said first pin protruding through said slot, said locking plate including a stop pin, fixedly connected to said locking plate, for engaging a selected one of said notches to lock the latch member in a selected position upon the rocking of said locking plate to a locking position and for disengaging said notches to unlock the latch member upon the rocking of said locking plate to an unlocking position;

a flange formed on said one of said rails, said flange including an elongated slot to guide said stop pin along only one linear path of motion and into engagement with a selected one of said notches, said arcuate slot formed in said locking plate being formed so that a wall of said arcuate slot opposite said elongated slot interacts with said first pin to preclude the movement of said locking plate and stop pin along said linear path of motion when said locking plate is in the locking position, a lever rotatably connected to one of said rails for rocking said locking plate to an unlocking position to permit the adjustment of the rails, and resilient means for urging said locking plate and said lever into the locking position.

2. The seat-supporting assembly of claim 1 further comprising resilient means for urging the rotation of said latch member when said locking plate is rocked to an unlocking position.

3. A seat-supporting assembly for selectively and independently adjusting the vertical positions of the front and rear portions of an automobile seat comprising:

a seat rail for attachment to an automobile seat, a floor rail for attachment to an automobile floor, a rotatable first latch member pivotably mounted at one point to the rearward portion of the seat rail and at another point to the rearward portion of the floor rail for permitting the selective adjustment of the relative positions of the rearward portions of the rails upon its rotation, said first latch member including a plurality of spaced notches, a rotatable second latch member pivotably mounted at one point to the forward portion of said first seat rail and pivotably interconnected at a second point to the forward portion of the floor rail for adjusting the relative positions of the forward portions of the rails upon its rotation, said second latch member including a plurality of spaced notches, a first locking plate rockably connected to said first seat rail by the combination of a first pin fixedly mounted on said first seat rail and a first elongated arcuate slot formed in said first locking plate, said first pin protruding through said first slot, said first locking plate including a first stop pin for selectively engaging and disengaging the spaced notches of said first latch member and the adjustment of the rearward portions of said rails when the notches are disengaged and to preclude the rotation of said first latch member and the adjustment of the rearward portions of said rails when the notches are engaged, a first flange formed on said seat rail and including a first elongated slot to guide said first stop pin along only one linear path of motion and into engagement with one of said notches of said first latch member, said first arcuate slot formed in said first locking plate being formed so that a wall of said first arcuate slot opposite said first elongated slot interacts with said first pin to preclude the movement of said first locking plate and first stop pin along said linear path of motion when said first locking plate is in the first locking position, a second locking plate rockably connected to said seat rail by the combination of a first pin fixedly mounted on said seat rail and an elongated arcuate slot formed in said second locking plate, said second pin protruding through said slot, said second locking plate including a second stop pin for selectively engaging and disengaging the spaced notches of said second latch member to permit the rotation of said second latch member and the adjustment of the forward portions of said rails when the stops are disengaged and to preclude the rotation of said second latch member and the adjustment of the forward portions of said rails when the notches are engaged, a second flange formed on said seat rail and including a second elongated slot to guide said second stop pin along only one linear path of motion and into engagement with one of said notches of said second latch member, said second arcuate slot formed in said second locking plate being formed so that a wall of said second arcuate slot opposite said second elongated slot interacts with said second pin to preclude the movement of said second locking plate and second stop pin along said linear path of motion when said second locking plate is in the second locking position, a lever interconnected with said first and second locking means for selectively disengaging said locking means from said latch members, and resilient means for urging said locking plate and said lever into the locking position.

4. The seat-supporting assembly of claim 3 further comprising:

a second seat rail substantially parallel to said first seat rail, a second floor rail substantially parallel to said first floor rail, first linkage means pivotably mounted at one point to the rearward portion of said second seat rail and at a second point to the rearward portion of said second floor rail for permitting the selective adjustment of the rearward portions of said second rails upon its rotation, second linkage means pivotably mounted at one point to the forward portion of said second seat rail and pivotably interconnected at a second point to the forward portion of said second floor rail for permitting the selective adjustment of the forward portions of said second rails upon its rotation, means connecting said first latch member with said first linkage means for rotating said first linkage means and adjusting the relative positions of the rearward portions of said second rails upon the rotation of said first latch member, and means connecting said second latch member with said second linkage means for rotating said second linkage means and adjusting the relative positions of the forward portions of said second rails upon the rotation of said second latch member.

5. The seat supporting assembly of claim 3 further comprising:

resilient means for urging the simultaneous rotation of said first latch member and said first linkage means when said first locking plate is rocked to an unlocking position.

* * * * *